Inventor
ANTHONY J. VASSELLI
By
Victor D. Borst
Attorney

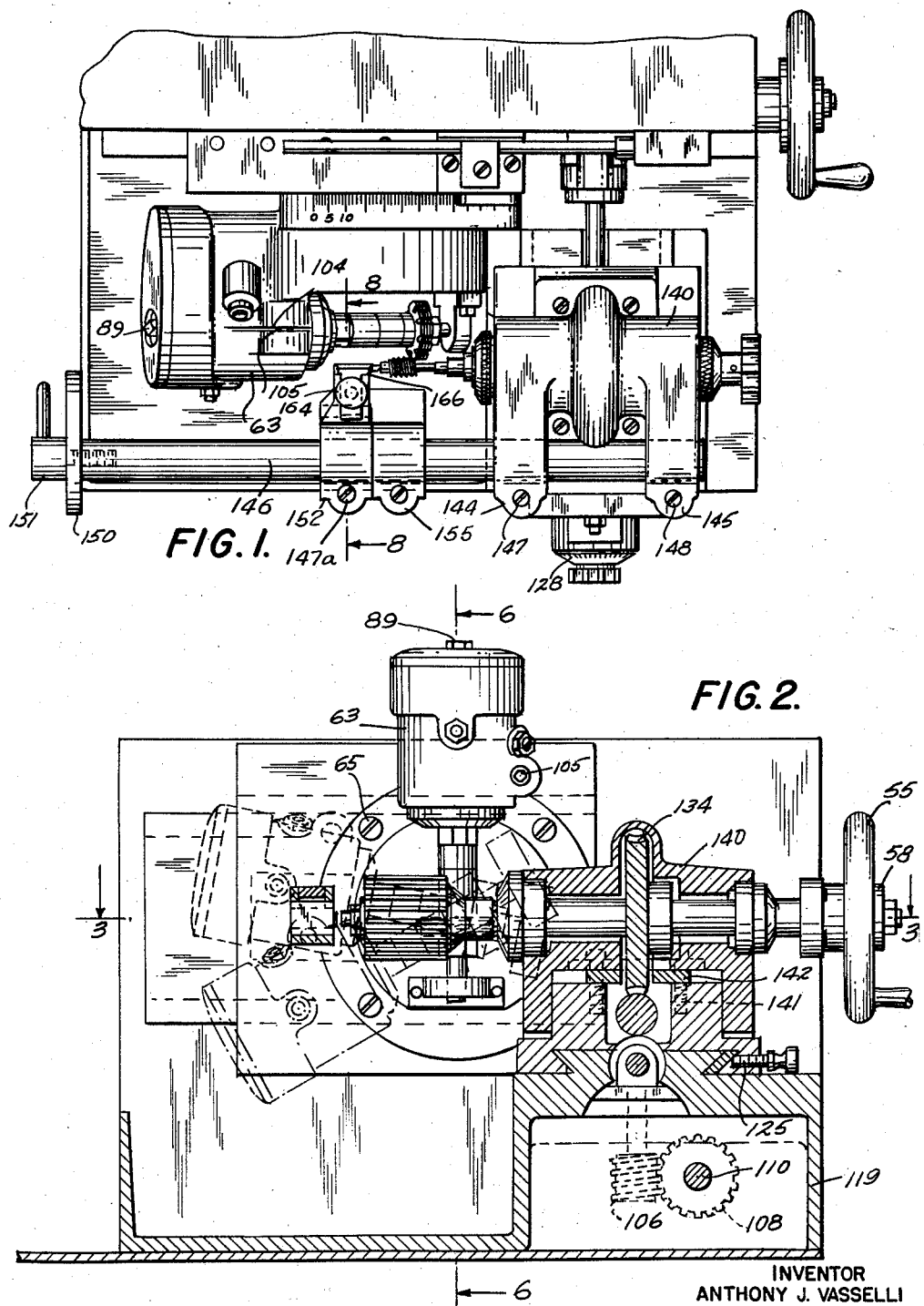

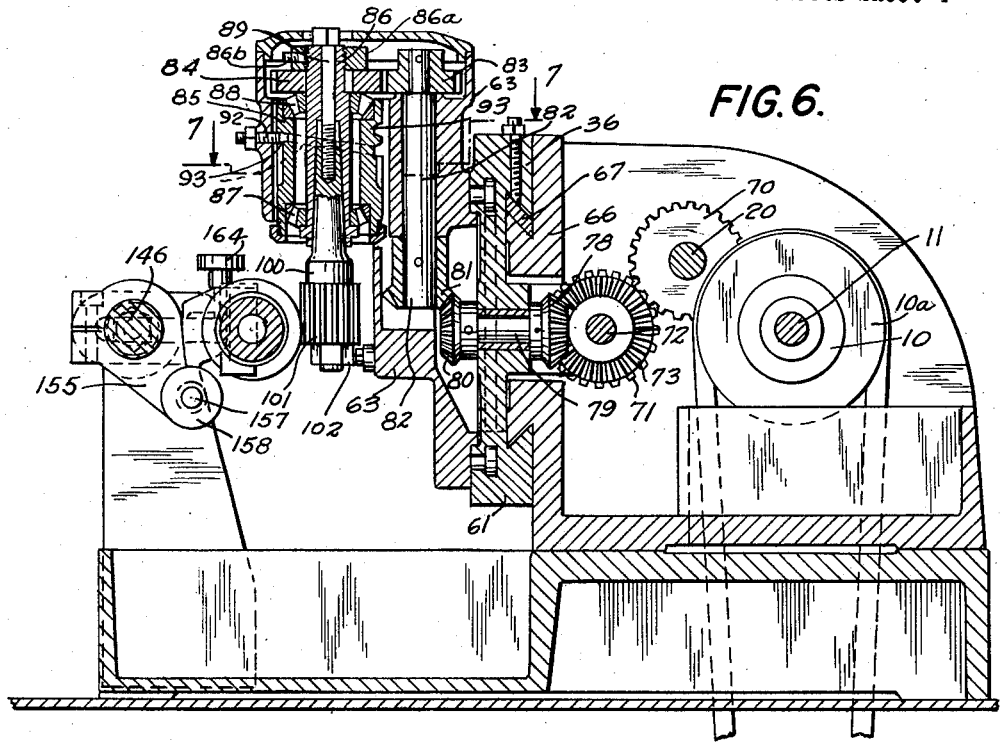
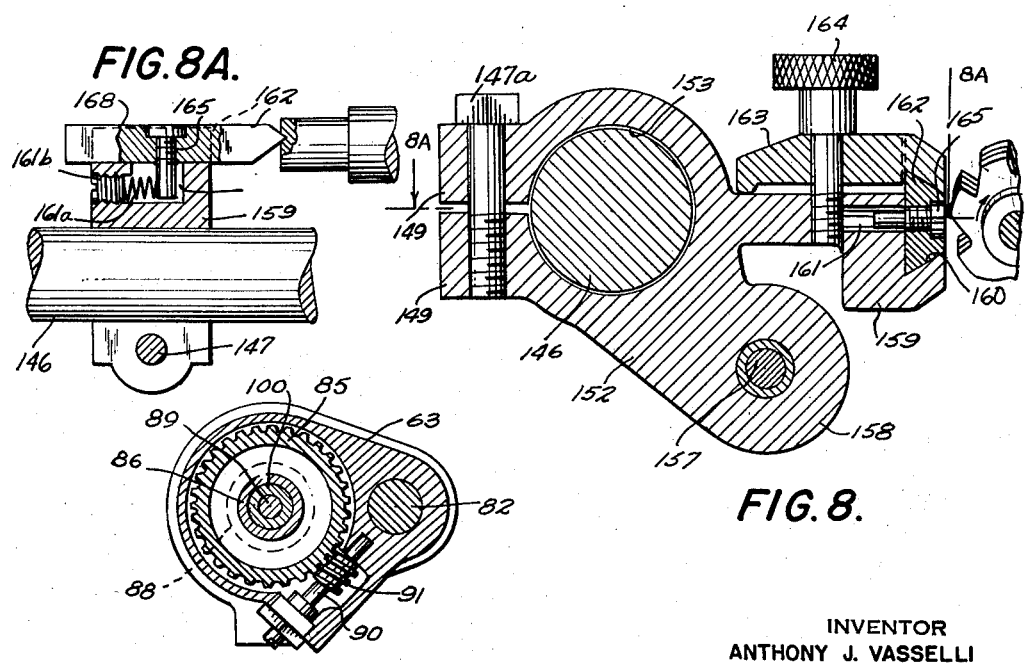

Aug. 4, 1959     A. J. VASSELLI     2,897,728
UNIVERSAL GEAR HOBBING MACHINE
Filed June 20, 1955     5 Sheets-Sheet 5
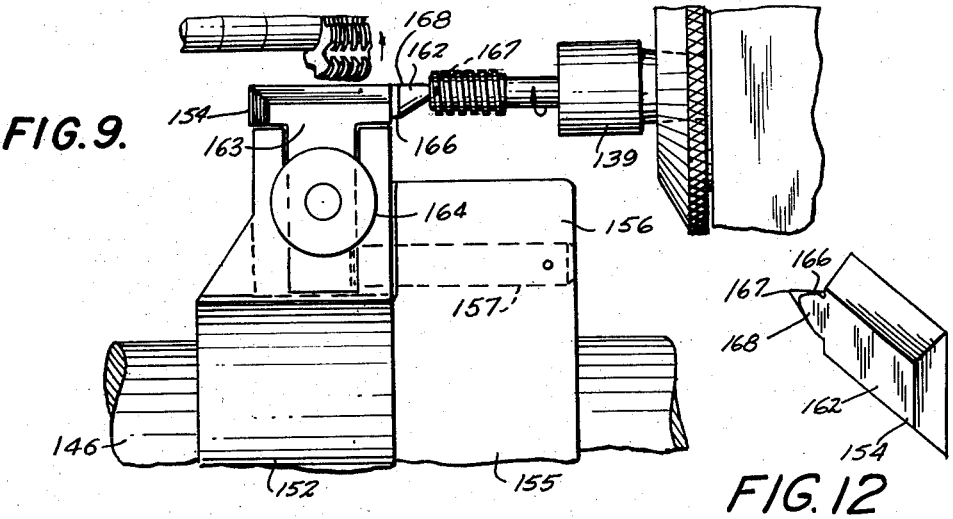
FIG. 9.
FIG. 12
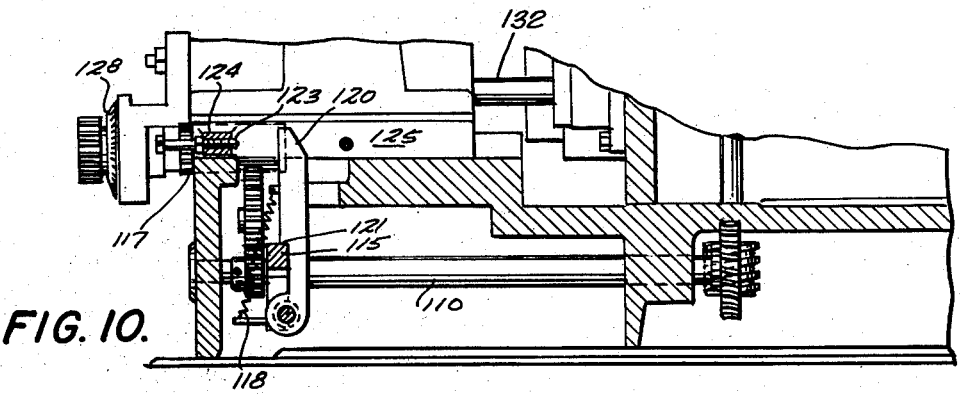
FIG. 10.
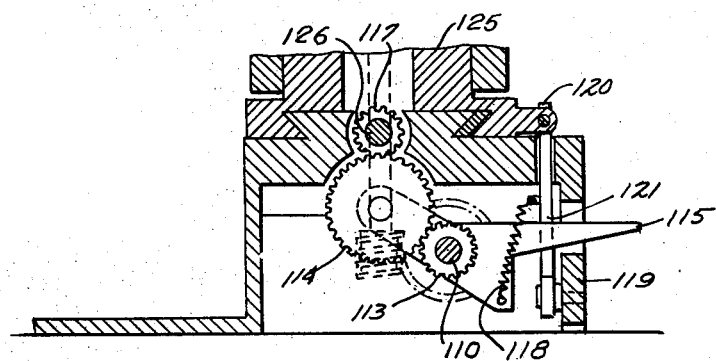
FIG. 11.
INVENTOR
ANTHONY J. VASSELLI
BY
ATTORNEY United States Patent Office 2,897,728
Patented Aug. 4, 1959

2,897,728

UNIVERSAL GEAR HOBBING MACHINE

Anthony J. Vasselli, West Orange, N.J.

Application June 20, 1955, Serial No. 516,513

3 Claims. (Cl. 90—4)

This invention relates to improvements in gear generating machines and particularly to machines which are adapted for universal gear cutting service, namely, for cutting fine pitch spur and helical gears, worms and worm wheels.

Heretofore machines have been designed to cut spur gears and helical gears, including spiral gears of the desired pitch, hand and depth. This invention contemplates a gear cutting device which is adapted to generate right and left hand threaded worms as well as spur and helical gears, and, moreover, is adapted to cut the teeth of the spiral gears of either right or left hand thread with the hob disposed to the work spindle at any angle between zero and ninety degrees in two quadrants. Accordingly provision is made for cutting the teeth in the work blank from either side of the axis of the work spindle and for maintaining the same direction of longitudinal feed of the cutter or hob relative to the blank while changing the direction of rotation of the cutter or hob according to which side of the work spindle axis the cutting is performed.

It is therefore an object of the invention to provide a universal gear type generating machine which is adapted to generate worms as well as gears of various types, including spurs and spirals.

An object of the invention is to provide a worm and gear generating machine which is adapted to cut right and left hand spiral gears and generate right and left hand worms.

Another object is to provide a gear generating machine which is capable of generating double, triple and quadruple thread worms from either side of the work axis.

Another object of the invention is to provide a gear generating machine which is capable of cutting right and left hand worms with fine pitch threads.

Another object is to provide a machine capable of cutting small diameter pinions, spirals and worms with accuracy.

Other objects and advantages of the invention will be appreciated on reading the detailed description thereof which follows in conjunction with the accompanying drawings, in which:

Fig. 1 is a partial plan of the gear generating device showing the cutting head in position to generate a right hand worm;

Fig. 2 is a vertical section taken on line 2—2 of Fig. 3 showing the cutting head in various positions;

Fig. 6 is a vertical section taken on the line 6—6 of Fig. 2;

Fig. 7 is an enlarged framentary section through the cutting head taken on line 7—7 of Fig. 6;

Fig. 8 is an enlarged detail taken on line 8—8 of Fig. 1;

Fig. 8A is an enlarged section taken on line 8A—8A of Fig. 8;

Fig. 9 is a detail of the support for the work center;

Fig. 10 is a section taken on the line 10—10 of Fig. 3;

Fig. 11 is a section taken on the line 11—11 of Fig. 5; and

Fig. 12 is a detail showing the center.

Figure 3:
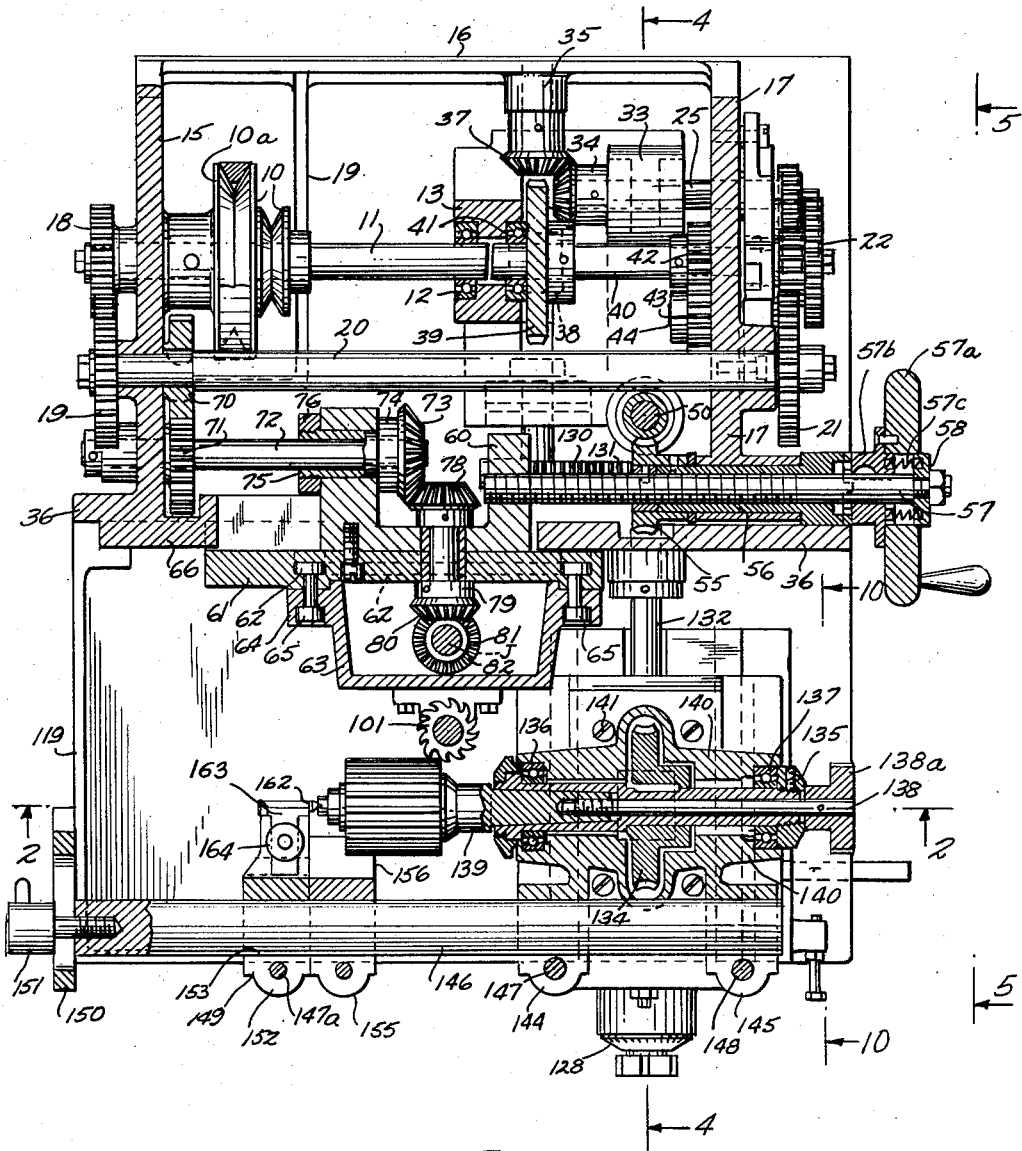
Fig. 3 is a plan section taken on line 3—3 of Fig. 2 showing the cutter in position to generate a spur gear.

Referring to Fig. 3 in the drawings the numerals 10 and 10a refer to a dual size pulley 10 which is mounted by means of its hub on a split shaft 11 and is employed to transmit power from a motor source (not shown) to the gear sections of the gear cutting machine. The shaft 11 is journaled in bearings 12, supported in a base extension member 13 and in bearings (not shown) in transverse wall section 15. Back longitudinal wall 16 connects the transverse wall 15 on the left hand side of the machine to a second transverse wall section 17 on the right side of the machine.

A driving pinion 18 is mounted on the shaft 11 and is in meshing engagement with a gear 19. The gears 18 and 19 may be changed to increase or decrease the speed of the hob depending on the hardness of the work blanks. The gear 19 is mounted on a drive shaft 20 which extends longitudinally the entire width of the machine being journaled in the transverse wall sections 15 and 17.

The hob is driven in the following manner. A gear 70 is secured to the shaft 20 adjacent the transverse wall section 15 and engages a gear 71 mounted on shaft 72 which is rotatably supported in the transverse wall section 15 and the left leg of the U bracket 60. The shaft 72 is provided with a key way at its inner end on which there is mounted a bevel gear 73 having a key bearing hub 74 and sleeve 75 secured to the hub. A collar 76 is screwed onto the sleeve 75 against the outer face of the bracket 60. A bevel gear 78 engaging the bevel gear 73 is pinned to a shaft 79 which extends through the female slide member 61 and into the cutter housing 63. A bevel gear 80 is mounted on the shaft 79 within the cutter housing and engages a bevel gear 81 therein. The gear 81 is mounted on a shaft 82 which extends to the top of the housing 63 where a gear 83 is secured thereto. A gear 84 is in mesh with gear 83 and is keyed to an inner sleeve 86 which is journaled on the inner races of bearings 87 and 88. A nut 86a having a set screw 86b is received on the screw threaded upper end of the sleeve 86 over the gear 84 serving to secure a smooth running assembly for the gears, sleeve and bearings. An outer sleeve 85 is mounted on the outer races of the bearings 87 and 88. The exterior surface of the outer sleeve 85 has teeth in the manner of a worm wheel. A worm shaft 90 having a worm 91 engaging the teeth of the sleeve 85 is in a tangential bore in the housing 63. The shaft 90 is provided with a screw slot for adjustment. A cam stud 92 is radially disposed in the housing 63 and its inner end engages a spiral groove 93 on the surface of the outer sleeve. The spiral groove 93 is slightly pitched and hence the rotation of the outer sleeve by the worm 91 causes the hob to be axially raised or lowered relative to the work. A screw bolt 89 is received within the sleeve 86 and is threaded into the tapered end of an arbor 100 on which hob 101 is mounted. A bracket 102 supported by the base of the housing 63 rotatably supports the lower end of the cutter spindle 100. The portion of the housing 63 which embraces the sleeve is split as at 104. The split housing is caused to clamp the sleeve 85 in its adjusted axial position by means of bolt 105. This mechanism is provided for centralizing the cutting teeth of the hob with respect to the teeth being generated on the work blank to assure symmertical and uniform formation of each generated tooth.

A U bracket 60 is provided with a threaded aperture in its right leg for receiving the end of the feed screw 57 being longitudinally moved or fed thereby. Bolted to the U bracket 60 is a female slide member 61 having a T-shaped annular groove 62 milled therein. A housing 63 for the cutter gearing having a flange 64 is pivotally secured to the female slide member 61 by means of adjusting screws 65 which are received in holes in the flange 64 and have clamping elements supported on their bottom ends which are received by the groove 62 in the female slide member 61.

The front wall section 36 has a male member 66 integrally mounted thereon, which member is received in dovetail fashion in a shallow depression provided in the rear face of the female slide member 61. A wear bar 67 is provided between the sliding faces on one side and is adapted to take up any wear occurring between the elements. It is accordingly understood that the housing 63 may be pivoted or angularly disposed according to the lead desired for the generated teeth of the helical gear or worm. Calibrations may be provided on the exposed face of the female slide member 61 so that the cutter may be properly oriented before the set screws are tightened.

A gear 21 is mounted on the shaft 20 and meshes with a compound gear 22 which in turn engages a second compound gear 23. The gears 22 and 23 are carried on an adjustable bracket 24 which is pivotally mounted on shaft 25 being secured in position by a screw 26 which passes through an arcuate slot in the bracket and the frame of the machine. A pivotal gear 27 is mounted on the shaft 25 and is adapted to engage compound gear 23. This compound gear train constitutes the indexing gears to establish the desired ratio which determines the number of teeth to be cut on the work blank.

The shaft 25 is journaled in a bearing box 33 supported from the base of the machine and a bevel gear 34 is mounted on the inner end of the shaft 25. A shaft 35 extends transversely from the back wall 16 to front wall 36 and is journaled in the two wall sections. A bevel gear 37 is pinned to the shaft 35 being in driven engagement with bevel gear 34. A worm 38 s carried by the shaft 35 and a worm wheel 39 meshes therewith.

Mounted on the shaft 35 adjacent and under the bracket 60 is a spur gear 130 which meshes with a second spur gear 131 secured to a shaft 132 extending to the work spindle section of the machine. A worm 133 on the shaft 132 engages a worm wheel 134 which is mounted on the work spindle holder 135 within work spindle housing 140. The holder 135 is supported in bearings 136 and 137 on each side of the worm wheel and is threaded on its outer end. A draw screw 138 is provided on the holder and is threaded on its inner end and is provided with a handle 138a. A work arbor 139 is secured to the threaded end of the draw screw 138 and has a tapering surface which mates with the conical, interior surface of the inner end of the holder 135.

Figure 4:
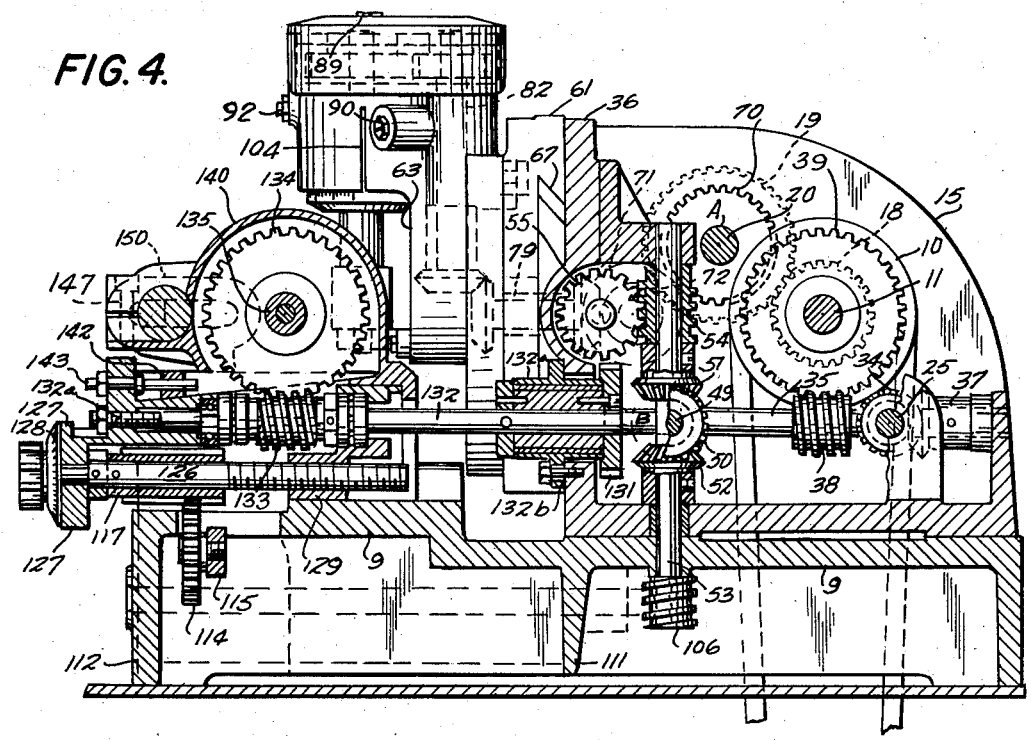
Fig. 4 is a vertical, transverse section taken on line 4—4 of Fig. 3.
Figure 5:
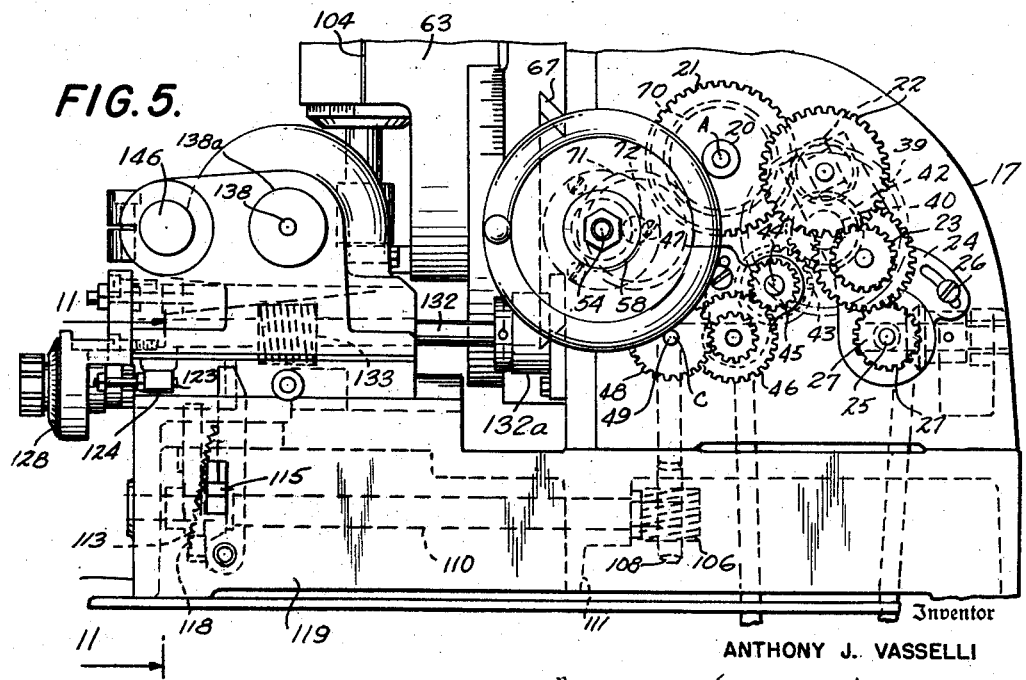
Fig. 5 is a right hand end elevation of the device with the upper portion broken away.

The work spindle housing 140 is attached to the carriage 125 by means of four take-up screws 141. Inserted between the carriage 125 and the housing is a tapered, forked wedge 142 shown in Fig. 4. Wedge adjustment screw 143 is rotatably carried in the bracket and is received in a tapped hole in the wedge. Transverse displacement of the wedge 142 by the screw 142 permits the housing 140 to be vertically adjusted with respect to the carriage 125 by means of the take-up screws 141. The shaft 132 is journaled in a bushing box 132a which is supported in an aperture in the wall 36 which is slightly larger in diameter than that of the box. A slot in box flange 132b is also slightly larger than the shank of the clamping screw received by the slot permitting a fine vertical adjustment of the driven end of shaft 132 along with that of the housing 140 to keep the shaft 132 level. The purpose of providing means for vertically adjusting the position of the housing 140 is to compensate for wear between the worm 133 and worm wheel 134.

The housing 140 has a pair of split, clamping extensions 144 and 145. The extensions are provided with apertures which are longitudinally aligned to receive a work support bar 146. Bolts 147 and 148 are provided in the split extensions 144 and 145 respectively, and serve to rigidly clamp the bar 146. The extreme left hand end of the bar 146 is supported in a slotted bracket 150 the lower end of which is bolted to the frame 119. The left end of the bar 146 has a tapped hole to receive a clamping member 151 the shank of which is passed through the slot and is received in the tapped hole of the bar to support the bar in the bracket.

The work supporting means has been especially designed to permit the cutter to be pivoted at least 180°. An intermediate bracket 152 having a bore 153 through which the work support bar 146 passes approximately midway between the supporting housing 140 and the bracket 150 is provided for supporting the work. The bracket 152 is adjustably secured on the work support bar 146 by means of a clamping bolt 147a through its split extension 149. Also secured to the bar 146 adjacent the bracket 152 is a guide bracket 155 having a rearwardly and downwardly disposed extension 156 which rigidly carries a guide rod 157. A similarly disposed extension of the intermediate bracket 152 is apertured to receive the guide rod 157 which serves to lock the centrally disposed bracket 152 in accurate alignment for performing its work supporting function. The intermediate bracket 152 has a rearwardly and horizontally extending platform member 159. The member 159 has an inclined lip 160 and an elongated slot 161. A center 162 is held against the end of the member 159 by the lip 160 and a center clamp 163 which is releasably locked to the platform member 159 by a thumb screw 164. A fillister head screw 165 is passed through the center 162 and into the slot 161. As shown in Fig. 8A a spring 161a is provided in the slot 161 and impinges on the screw 165 carried by the center. A screw 161b in the member 159 is provided to adjust the compression of the spring. In practice the bracket 152 is moved along the bar 146 until the center 162 contacts the work blank and the spring 161a is somewhat compressed. By clamping the bolt 147a while the center is thus biased against the work piece and then tightening the thumb screw 164 to prevent relative movement between the center and the platform member, a running fit between the center and the work piece is assured.

The body of the center 162 has a partial conical extension piece 166 which holds one end of the work. The pointed apex 167 of the conical extension is offset from the axis of the center toward the cutter and the axis of the extension piece 166 intersecting the apex and virtually extended through the center is located between the axis of the center and the flat face 168 of the center proximate the cutter. The location of the apex in this fashion permits the cutting teeth to approach the axial center of the work very closely and enables the gear generating machine to cut worms and pinions of unusually small diameters.

It is thus seen that the special design of the center and its supporting elements and the special provision for maintaining the direction of feed while reversing the direction of cutter rotation permit the cutter assembly to be oriented so that the axis of rotation of the cutter can be pivoted in one direction more than 90° from the right angled position with respect to the work axis. Hence the machine is capable of generating right and left hand worms of single and double, triple and quadruple thread as well as fine pitch spirals, gears and worm wheel. The worm wheel 39 is secured to shaft 40 which is rotatably supported in bearings 41 in the member 13. A gear 42 is mounted on the shaft 40 and drives a gear train including idler gear 43 on stud shaft gear 44 which is journaled in the transverse wall 17. A pinion 45 on stud shaft 44 meshes with a compound gear 46 exteriorly of the wall 17. Compound gear 46 is carried on an adjustable bracket similar to the bracket 24 and meshes with spur gear 48 whose stud shaft 49 passes through wall 17 carrying on its inner end a large bevel gear 50. These compound change gears or feed change gears are used to obtain the correct ratio for the amount of feed of the cutter to each revolution of the work. Bevel gear 50 engages a pair of bevel gears 51 and 52 which are selectively set screwed to vertical shaft 53 by removing a pilot end screw from one gear and placing it into the other. The direction of rotation of the driven shaft 53 depends on which of the two driving bevel gears is in driving relation to the shaft.

A worm 54 is mounted near the top of the vertical shaft 53 and is in meshing engagement with a worm wheel 55 secured to a sleeve 56 which is supported in a bore provided in the wall section 17. The sleeve 56 receives a feed screw 57 which is threaded on its inner end and supports a hand wheel 57a on its outer end. The hub 57b of the hand wheel is keyed to the feed screw 57 and is provided with clutch teeth which are adapted to mesh with corresponding clutch teeth on the outer end of the sleeve 56. Springs 57c are provided in the counter bore of the hand wheel 57a being backed by a plate 58 and impinging on the hub of the handwheel to urge the key-carrying hub into clutching engagement with the sleeve whereby the feed screw 57 is powered through its key way and the sleeve. It is seen that by disengaging the hand wheel from its clutch connection with the sleeve 56, the hand wheel may be employed to manually operate the feed screw so as to return the cutter to its starting position after a job has been completed, as explained below. In cutting worm wheels the work spindle and transverse power feed for the work spindle are operated to obtain continuous, uniform feed in the following manner. A worm 106 on vertical shaft 53 is in meshing engagement with a worm wheel 108 mounted on a transverse shaft 110 which is rotatably supported in vertical frame members 111 and 112. A pinion 113 is mounted on the shaft 110 near the member 112 and meshes with a spur gear 114 carried by the free end of lever 115 which is pivotally mounted on the shaft 110. The gear 114 is adapted to engage a spur gear 117 whose face is substantially greater than the gear 114 so that their engagement during the entire traverse of work feed may be maintained. The lever 115 is spring biased by means of spring 118 so as to urge the gear 114 and spur gear 117 out of engagement. The spring 118 is connected to the lower end of the lever 115 and a pin on the member 120. Feed stop arm 120 is pivoted on the frame member 119 and has a head portion at its free end which presents an outstanding lip 121. The lip is urged into holding engagement with the lever 115 by means of a tension spring 118 which connects the arm 120 to a pin pressed into lever 115 adjacent its bottom edge. A transversely adjustable bolt 123 is carried in a bracket 124 on a carriage 125 which is supported by the frame members in dovetail relation and is adapted to contact the head portion of the arm 120 to stop the drive for the feed when the tooth is cut to the desired depth.

The spur gear 117 is pinned to a feed screw 126 which is supported in a dial bracket 127 and an interior threaded bronze nut 129 connected to the base 9. Axial rotation of the screw 126 whether by power or hand as determined by the position of lever 115 transversely feeds the carriage 125. A calibrated collar 128 mounted on the feed screw 126 outside of the bracket 127 measures the feed depth.

It is understood that while a particular embodiment of the invention has been described in some detail, the invention is not limited thereto except as it is defined in the appended claims.

What is claimed is:

1. In a gear generating machine a longitudinally disposed drive shaft, pivotal gear generating means, a gear train driving said generating means, a second gear train connected to said drive shaft, bevel gear connections between said first and second gear trains whereby said generating means may be driven in any pivotal position, a vertical shaft, a pair of gears and a worm mounted on said vertical shaft, a driving gear disposed intermediate said pair of gears to selectively drive one of said pair of gears in a clockwise or counterclockwise direction, a screw connecting said worm with the generating means to feed longitudinally said generating means and a third gear train connecting the drive shaft with the driving gear whereby the direction of feed of said generating means may be maintained although the rotation of the drive shaft and said generating means is reversed.

2. In a gear generating machine a frame and gear generating means pivotally supported by said frame, a work support bar extending longitudinally the entire length of the machine, a work spindle holder, a work spindle housing supporting one end of said work support bar and said work spindle holder, a bracket attached to said frame and supporting the other end of said work support bar, an intermediate bracket adjustably supported on said work support bar, said intermediate bracket being adapted to coact with said spindle holder to support a work blank, said intermediate bracket being the sole support for one end of said bar whereby the pivotal motion of the generating means will be unimpeded by the work supporting mechanism.

3. In a gear generating machine as defined in claim 4 a drive shaft, means for transversely feeding said work spindle housing and said work support bar, a gear train connecting said drive shaft and said feeding means, a lever arm pivotally mounted in said machine, one of the gears of said gear train being mounted on said lever arm, said gear being biased out of operative connection in the gear train, a feed stop arm pivotally mounted on the frame and adapted to contact the lever arm to hold said gear in operative engagement in the gear train and an adjustable member carried by the work spindle housing and adapted to contact said feed stop arm to interrupt the transverse feed of the work spindle housing at a preselected point during the operation of the machine.

References Cited in the file of this patent

UNITED STATES PATENTS

| | | |
|---|---|---|
| 110,951 | Brainard | Jan. 17, 1871 |
| 978,113 | Catucci | Dec. 6, 1910 |
| 1,078,857 | Jackson | Nov. 18, 1913 |
| 2,073,917 | Zimmermann | Mar. 16, 1937 |
| 2,214,504 | Lux | Sept. 10, 1940 |
| 2,231,865 | Adams | Feb. 18, 1941 |
| 2,374,255 | Davenport | Apr. 24, 1945 |
| 2,451,447 | Ransome | Oct. 12, 1948 |
| 2,593,936 | Teetor | Apr. 22, 1952 |

UNITED STATES PATENT OFFICE
CERTIFICATE OF CORRECTION

August 4, 1959

Patent No. 2,897,728

Anthony J. Vasselli

It is hereby certified that error appears in the printed specification of the above numbered patent requiring correction and that the said Letters Patent should read as corrected below.

Column 6, line 38, for the claim reference numeral "4" read -- 2 --.

Signed and sealed this 1st day of December 1959.

(SEAL)
Attest:

KARL H. AXLINE
Attesting Officer

ROBERT C. WATSON
Commissioner of Patents